US010363891B2

(12) United States Patent
Zaldivar Ortiz et al.

(10) Patent No.: US 10,363,891 B2
(45) Date of Patent: Jul. 30, 2019

(54) ASSEMBLY, A CLIP ASSEMBLY FOR RETAINING A CONDUIT AND A VEHICLE

(71) Applicant: GM GLOBAL TECHNOLOGY OPERATIONS LLC, Detroit, MI (US)

(72) Inventors: Laura Nathaly Zaldivar Ortiz, Mainz (DE); Alejandro Perez-Ruiz, Warren, MI (US); Steven E. Morris, Fair Haven, MI (US); Fausto Eleazar Vazquez Flores, Cypress, CA (US); Joel Mejia Arriaga, Zinacantepec (MX); Marcos Rodriguez Lopez, Toluca (MX)

(73) Assignee: GM Global Technology Operations LLC, Detroit, MI (US)

( * ) Notice: Subject to any disclaimer, the term of this patent is extended or adjusted under 35 U.S.C. 154(b) by 143 days.

(21) Appl. No.: 15/459,850

(22) Filed: Mar. 15, 2017

(65) Prior Publication Data
US 2018/0015894 A1 Jan. 18, 2018

Related U.S. Application Data

(60) Provisional application No. 62/362,899, filed on Jul. 15, 2016.

(51) Int. Cl.
*F16L 3/24* (2006.01)
*B60R 16/08* (2006.01)
(Continued)

(52) U.S. Cl.
CPC .......... *B60R 16/08* (2013.01); *B60R 16/0215* (2013.01); *F16L 3/1075* (2013.01); *F16L 3/237* (2013.01)

(58) Field of Classification Search
CPC ....................................................... F16L 3/24
(Continued)

(56) References Cited

U.S. PATENT DOCUMENTS

| 4,216,930 A * | 8/1980 | Rossler, Jr. ............... | F16L 5/00 |
| | | | 174/153 G |
| 4,669,688 A * | 6/1987 | Itoh .......................... | F16L 3/23 |
| | | | 24/16 PB |

(Continued)

FOREIGN PATENT DOCUMENTS

| CN | 202302324 U | 7/2012 |
| CN | 104863946 A | 8/2015 |

(Continued)

*Primary Examiner* — Terrell L McKinnon
*Assistant Examiner* — Michael McDuffie
(74) *Attorney, Agent, or Firm* — Quinn IP Law

(57) ABSTRACT

A clip assembly includes a support defining an opening and a clip attachable to the support. The clip includes a body configured to retain a conduit and a retention member extending from the body and having a first portion inserted through the opening to attach the clip to the support and a second portion engaging the support inside the opening to prevent rotation of the clip relative to the support. The retention member is movable between an initial position from which the first portion of the retention member elastically deforms as the first portion is inserted into the opening and a final position at which the first portion of the retention member has elastically deformed back toward an original configuration once the first portion has passed beyond the opening such that the second portion engages the support inside the opening to prevent rotation of the clip relative to the support.

19 Claims, 7 Drawing Sheets

(51) Int. Cl.
 *B60R 16/02* (2006.01)
 *F16L 3/10* (2006.01)
 *F16L 3/237* (2006.01)
(58) Field of Classification Search
 USPC ......... 248/49, 56, 58, 60, 62, 65, 67.5, 67.7, 248/68.1, 71, 73, 74.1, 74.4
 See application file for complete search history.

(56) References Cited

U.S. PATENT DOCUMENTS

| | | | | |
|---|---|---|---|---|
| 5,233,881 | A * | 8/1993 | Sayen | E05B 79/12 248/222.12 |
| 5,257,768 | A * | 11/1993 | Juenemann | F16L 55/035 248/604 |
| 5,276,280 | A * | 1/1994 | Ball | H02G 3/065 174/542 |
| 5,820,048 | A * | 10/1998 | Shereyk | F16L 3/1215 248/68.1 |
| 7,011,277 | B2 * | 3/2006 | Mizukoshi | F16L 3/223 248/68.1 |
| 7,036,775 | B2 * | 5/2006 | Nakanishi | F16L 3/223 248/68.1 |
| 7,219,931 | B2 * | 5/2007 | Kato | B60R 16/0207 248/60 |
| 7,387,282 | B2 * | 6/2008 | Kovac | B60R 16/0215 248/55 |
| 7,404,548 | B2 * | 7/2008 | Kwilosz | B60R 16/0215 248/71 |
| 7,523,898 | B1 | 4/2009 | Barry et al. | |
| 7,533,852 | B2 * | 5/2009 | Stigler | F16L 3/223 24/555 |
| 7,559,511 | B2 * | 7/2009 | Yon | F16L 3/2235 174/135 |
| 8,262,035 | B2 * | 9/2012 | Bleus | F16L 3/1025 248/230.7 |
| 8,313,064 | B2 * | 11/2012 | Stocker | F16L 3/18 248/71 |
| 8,366,059 | B2 * | 2/2013 | Fannon | E05B 79/20 24/16 PB |
| 8,833,706 | B2 * | 9/2014 | Elsmore | H02G 3/32 138/106 |
| 9,004,416 | B2 * | 4/2015 | Ogawa | F16L 3/13 24/530 |
| 9,181,966 | B2 * | 11/2015 | Ogawa | F16L 3/13 |
| 2002/0000499 | A1 * | 1/2002 | Aoki | F16L 3/10 248/74.4 |
| 2009/0294600 | A1 | 12/2009 | Dodge | |
| 2011/0303456 | A1 * | 12/2011 | Blanchard | F16L 3/1091 174/480 |
| 2012/0115010 | A1 | 5/2012 | Smith et al. | |
| 2013/0019455 | A1 | 1/2013 | Morris | |
| 2013/0214100 | A1 * | 8/2013 | Edmond | F16L 3/227 248/74.4 |
| 2014/0374544 | A1 * | 12/2014 | Pearson | F16L 3/223 248/68.1 |
| 2015/0102621 | A1 | 4/2015 | Smyth et al. | |

FOREIGN PATENT DOCUMENTS

| | | |
|---|---|---|
| JP | 2006046535 A | 2/2006 |
| WO | 2007021437 A2 | 2/2007 |

* cited by examiner

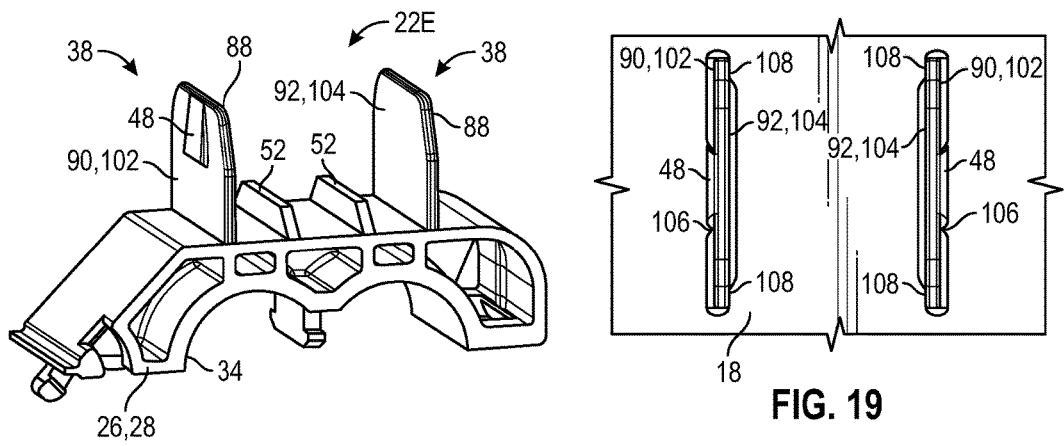
FIG. 18
FIG. 19
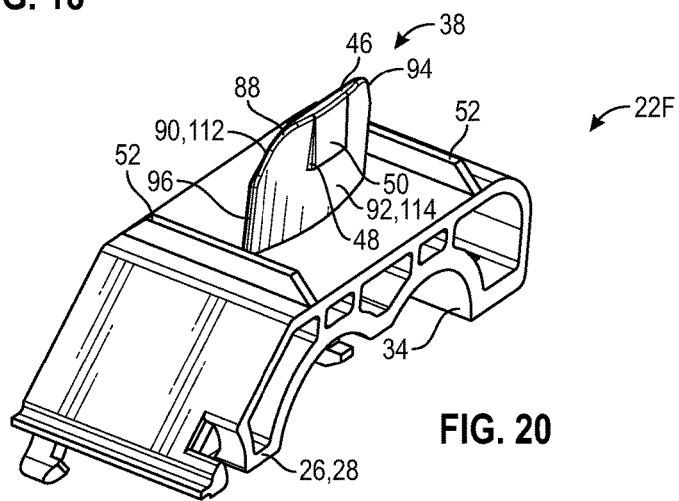
FIG. 20
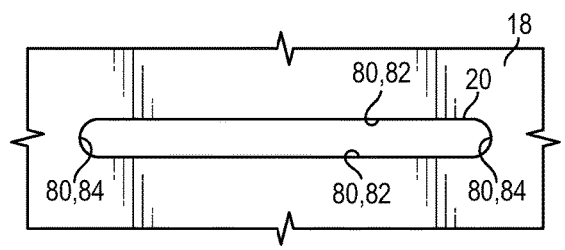
FIG. 21
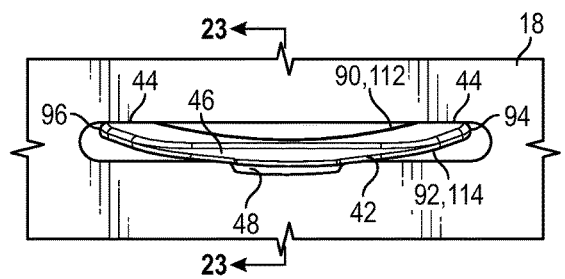
FIG. 22

ASSEMBLY, A CLIP ASSEMBLY FOR RETAINING A CONDUIT AND A VEHICLE

CROSS-REFERENCE TO RELATED APPLICATIONS

This application claims the benefit of U.S. Provisional Application No. 62/362,899, filed on Jul. 15, 2016, which is hereby incorporated by reference in its entirety.

INTRODUCTION

Vehicles can include conduits that fluidly connect various components. For example, a condenser, radiator and fan module (CRFM) can have one or more conduits that transfer coolant. A clip can be utilized to secure the conduit relative to the CRFM. The clip can include a single tree barb that is inserted into a hole of the CRFM to secure the conduit to the CRFM. The single tree barb can allow rotation of the clip relative to the CRFM.

SUMMARY

The present disclosure provides a clip assembly for retaining a conduit. The assembly includes a support defining an opening and a clip attachable to the support via the opening. The clip includes a body configured to retain the conduit. The clip includes a retention member extending from the body and having a first portion inserted through the opening to attach the clip to the support and a second portion directly engaging the support inside the opening to prevent rotation of the clip relative to the support. The retention member includes a tab. Furthermore, the retention member is movable between an initial position from which the first portion of the retention member elastically deforms from an original configuration as the tab is inserted into the opening and a final position at which the first portion of the retention member has elastically deformed back toward the original configuration once the tab has passed beyond the opening such that the second portion directly engages the support inside the opening to prevent the rotation of the clip relative to the support.

The present disclosure also provides a vehicle including a condenser, radiator and fan (CRF) apparatus. The CRF apparatus includes a support defining an opening. The vehicle also includes a conduit configured to supply a fluid to the CRF apparatus. The vehicle further includes a clip attachable to the support via the opening. The clip includes a body configured to retain the conduit. The clip also includes a retention member extending from the body and having a first portion inserted through the opening to attach the clip to the support and a second portion directly engaging the support inside the opening to prevent rotation of the clip relative to the support. The retention member includes a tab. Furthermore, the retention member is movable between an initial position from which the first portion of the retention member elastically deforms from an original configuration as the tab is inserted into the opening and a final position at which the first portion of the retention member has elastically deformed back toward the original configuration once the tab has passed beyond the opening such that the second portion directly engages the support inside the opening to prevent the rotation of the clip relative to the support.

Additionally, the present disclosure provides an assembly including a support defining an opening and a body attachable to the support via the opening. The assembly also includes a retention member extending from the body. The retention member has a first portion inserted through the opening to attach the body to the support and a second portion directly engaging the support inside the opening to prevent rotation of the body relative to the support. The retention member includes a tab. The retention member is movable between an initial position from which the first portion of the retention member elastically deforms from an original configuration as the tab is inserted into the opening and a final position at which the first portion of the retention member has elastically deformed back toward the original configuration once the tab has passed beyond the opening such that the second portion directly engages the support inside the opening to prevent the rotation of the body relative to the support The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 18 is a schematic perspective view of part of the clip of a fifth configuration.

FIG. 19 is a schematic side view of the clip of FIG. 18 attached to the support.

FIG. 20 is a schematic perspective view of part of the clip of a sixth configuration.

FIG. 21 is a schematic side view of the support defining the opening of FIG. 22 in which part of the clip is inserted into.

FIG. 22 is a schematic side view of the clip of FIG. 20 attached to the support.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges. The phrase "at least one of" as used herein should be construed to include the non-exclusive logical "or", i.e., A and/or B and so on depending on the number of components.

Figure 1:
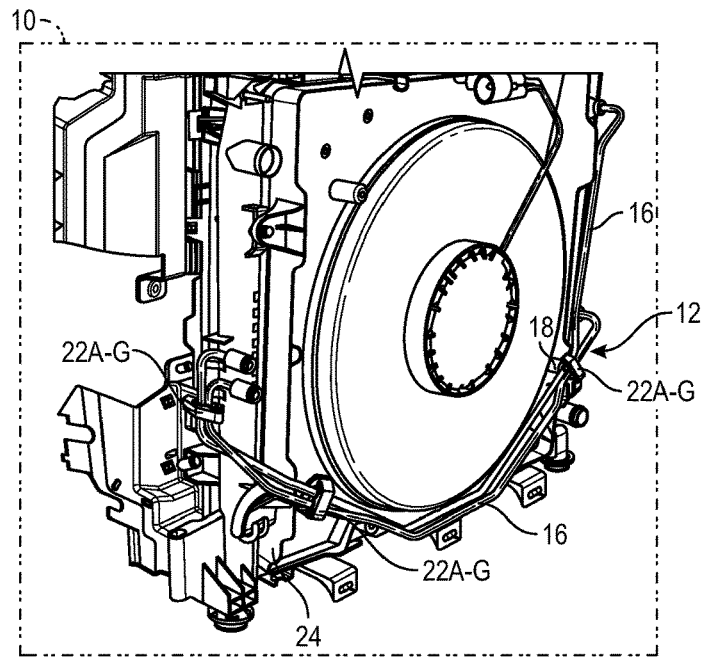
FIG. 1 is a schematic perspective view of a vehicle including a clip assembly.

Referring to the Figures, wherein like numerals indicate like or corresponding parts throughout the several views, a vehicle 10 and an assembly, which in certain embodiments is a clip assembly 12, are generally shown in FIG. 1.

The assembly, and thus, the clip assembly 12 can be utilized in a vehicle application or a non-vehicle application. Non-limiting examples of the vehicles 10 can include cars, trucks, motorcycles, boats, watercrafts, all-terrain vehicles, off-road vehicles, aircrafts, farm equipment or any other suitable vehicle. Non-limiting examples of the non-vehicles can include machines, farm equipment, electronics, appliances, or any other suitable non-vehicle.

In certain vehicle applications, the assembly can be part of an interior compartment and/or an engine compartment and/or a storage compartment of the vehicle 10. Non-limiting examples of the parts of the interior compartment/engine compartment/storage compartment can include one or more trim pieces, moldings, flooring, instrument panel, panels, wheelhouse liners, liners, dashboard, etc. Furthermore, in various vehicle applications, as shown in FIG. 1, the clip assembly 12 can be part of a condenser, radiator and fan (CRF) apparatus 14. It is to be appreciated that the CRF apparatus 14 can be referred to as a condenser, radiator and fan module (CRFM) as can be referred to by those skilled in the art. Generally, the CRF apparatus 14 of FIG. 1 can include a condenser, a radiator and a fan. In other vehicle applications, the clip assembly 12 can be part of a heating, ventilating and air conditioning unit (HVAC), part of a brake system, part of electrical wiring between components and/or one or more controllers, part of trim attachments, etc. As such, in certain embodiments, the assembly can be part of the CRF apparatus 14, the HVAC, the brake system, etc.

Vehicles 10, as well as non-vehicles, can utilize one or more conduits 16 (see FIG. 1) to connect various parts together. As one non-limiting example, one or more conduits 16 can deliver or supply a fluid to one or more parts. As another non-limiting example, one or more conduits 16 can electrically connect to one or more parts. The conduits 16 can contain a fluid, e.g., a gaseous fluid or a liquid fluid, or can contain one or more wires. Therefore, for the CRF apparatus 14 example, the conduit(s) 16 can be configured to supply the fluid to and/or from the CRF apparatus 14. It is to be appreciated that the conduits 16 can contain any suitable component. Non-limiting examples of the liquid fluid can include oil, coolant, water, brake fluid, transmission fluid, etc., and/or combinations thereof.

The clip assembly 12 can be utilized to retain the conduit 16. Therefore, for example, if it is desired to support the conduit 16 in a particular location, the clip assembly 12 can be utilized to maintain the conduit 16 in that particular location.

As best shown in FIG. 1, the assembly, and in certain embodiments, the clip assembly 12, includes a support 18 defining an opening 20 (as best shown in FIGS. 5, 11, 15, 21 and 27). The clip assembly 12 includes a clip 22A-G attachable to the support 18 via the opening 20. It is to be appreciated that one or more clips 22A-G can be utilized, and FIG. 1 illustrates a plurality of clips 22A-G for illustrative purposes only.

The support 18 can be any suitable configuration and any suitable location; and in one vehicle application example, the support 18 can be part of the CRF apparatus 14. For example, as shown in FIG. 1, the CRF apparatus 14 can include a housing 24 that contains various parts of, for example, the condenser, the radiator and/or the fan. The housing 24 can act as the support 18. In other embodiments, the support 18 can be part of the instrument panel or the dashboard.

Figure 2:
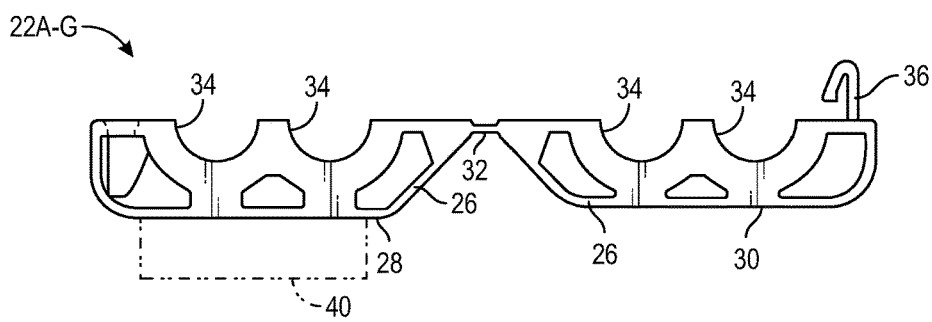
FIG. 2 is a schematic side view of a clip.

Referring to FIGS. 1 and 2, the assembly includes a body 26 that is attachable to the support 18 via the opening 20. The body 26 can be any suitable configuration, and non-limiting examples can include one or more trim pieces, moldings, flooring, instrument panel, panels, wheelhouse liners, liners, dashboard, clips 22A-G, etc. Therefore, in certain embodiments, the clip 22A-G can include the body 26 configured to retain the conduit 16. Furthermore, in certain embodiments, the body 26 can retain a plurality of conduits 16. The body 26 of the clip 22A-G can be movable between an open position (see FIG. 2) and a closed position (see FIG. 1).

Referring to FIG. 2, the body 26 can include a first segment 28 and a second segment 30 connected to each other by a hinge 32 which facilitates movement of the body 26 between the open and closed positions. The first and second segments 28, 30 can each define a recess 34 for receiving the conduit 16. In certain embodiments, the first and second segments 28, 30 can each define a plurality of recesses 34 for receiving a plurality of conduits 16 respectively. The body 26 is in the open position for positioning the conduit 16 in the recess 34 of one of the segments 28, 30, and at least one of the first and second segments 28, 30 move to the closed position for retaining the conduit 16. Therefore, the first segment 28 can move relative to the second segment 30 to the closed position, or the second segment 30 can move relative to the first segment 28 to the closed position, or both of the first and second segments 28, 30 can move to the closed position. Continuing with FIG. 2, the body 26 can include a latch 36 to retain the body 26 in the closed position.

A side profile of the body 26 is generally illustrated in FIG. 2, and the other side profile of the body 26 is a mirror image of the illustrated side profile. It is to be appreciated the side profiles of the body 26 can be any suitable configuration, and non-limiting examples can include one or more apertures, no apertures and/or combinations thereof. Therefore, for example, the side profiles of the first and/or second segments 28, 30 can define one or more apertures. As another example, the side profiles of the first and/or second segments 28, 30 can eliminate the apertures. As such, both of the side profiles of the first and second segments 28, 30 can define one or more of the apertures, both of the side profiles of the first and second segments 28, 30 can eliminate all of the apertures, and one side profile of the first and/or second segments 28, 30 can define one or more of the apertures and the other side profile of the first and/or second segments 28, 30 can eliminate one or more or all of the apertures. Furthermore, as yet another example, the side profiles of the first segment 28 can define the same or a different number of the apertures, and/or the side profiles of the second segment 30 can define the same or a different number of the apertures. If utilizing one or more of the apertures, the apertures can be any suitable configuration.

The assembly includes a retention member 38 extending from the body 26. Therefore, depending on the configuration of the body 26, the retention member(s) 38 can extend from one or more of trim pieces, moldings, flooring, instrument panel, panels, wheelhouse liners, liners, dashboard, clips 22A-G, etc. Referring to FIGS. 3, 8, 12, 13, 18, 20 and 24, the clip 22A-G includes the retention member 38 extending from the body 26. In certain embodiments, the retention member 38 is further defined as a plurality of retention members 38. The retention member(s) 38 can extend from any suitable location from the body 26 and as discussed in detail below, the retention member(s) 38 can include many different configurations. One non-limiting example of a general location 40 (illustrated in phantom lines in FIG. 2) that any of the retention member(s) 38 discussed herein can be disposed is shown in FIG. 2. Therefore, generally, the retention member(s) 38 can extend from one of the first and second segments 28, 30, and the basic configuration of the first and second segments 28, 30 as shown in FIG. 2 can remain the same for each of the embodiments. When discussing the details of the different embodiments of the retention member(s) 38, solely the segment that has the retention member(s) 38 are illustrated.

As indicated above, the retention member(s) 38 can be many different configurations, some of which are described herein. Each of the embodiments of the retention member(s) 38 are described below.

Each of the retention member(s) 38 of all of the embodiments have a first portion 42 inserted through the opening 20 to attach the body 26, and in certain embodiments the clip 22A-G, to the support 18. Furthermore, each of the retention member(s) 38 of all of the embodiments have a second portion 44 engaging the support 18 inside the opening 20 to prevent rotation of the body 26, and in certain embodiments the clip 22A-G, relative to the support 18. Said differently, each of the retention member(s) 38 includes a respective first portion 42 and a respective second portion 44. In certain embodiments, the second portion 44 directly engages the support 18 inside the opening 20 to prevent rotation of the body 26, and in certain embodiments the clip 22A-G, relative to the support 18.

The retention member(s) 38 of all of the embodiments is movable between an initial position from which the first portion 42 of the retention member(s) 38 elastically deforms from an original configuration as the first portion 42 is inserted into the opening 20 and a final position at which the first portion 42 of the retention member(s) 38 has elastically deformed back toward the original configuration once the first portion 42 has passed beyond the opening 20 such that the second portion 44 engages the support 18 inside the opening 20 to prevent the rotation of the body 26, and in certain embodiments the clip 22A-G, relative to the support 18. Therefore, the first portion 42 is deformable during insertion into the opening 20. Furthermore, the second portion 42 of the retention member(s) 38 of all of the embodiments can be elastically deformable to maintain engagement or contact inside the opening 20 when in the final position. Simply stated, the retention member(s) 38 of all of the embodiments can be elastically deformable, or said differently, elastically deflectable. Therefore, the configurations of the body 26 and/or the clip 22A-G provide a two-way or a four-way elastic averaging system by utilizing the elastically deformable retention member(s) 38 described herein.

The retention member(s) 38 of all of the embodiments include a distal end 46 spaced from the body 26. Each of the retention member(s) 38 extend from the body 26 to a respective distal end 46 spaced from the body 26. Generally, the first portion 42 of the retention member(s) 38 is disposed closer to the distal end 46 than the body 26. In certain embodiments, the distal end 46 is part of the first portion 42 of the retention member(s) 38.

In certain embodiments, the second portion 44 of the retention member(s) 38 is disposed closer to the body 26 than the first portion 42 of the retention member(s) 38. Therefore, in certain embodiments, the second portion 44 of the retention member(s) 38 is disposed between the first portion 42 of the retention member(s) 38 and the body 26. In other embodiments, the first and second portions 42, 44 are disposed on opposite sides of the retention member(s) 38, are disposed on a same side of the retention member(s) 38 or a combination of sides. Furthermore, in certain embodiments, the first and second portions 42, 44 can surround the respective retention member(s) 38.

Additionally, the retention member(s) 38 of all of the embodiments include a tab 48. In certain embodiments, the tab 48 extends from the first portion 42. Specifically, the tab 48 can extend outwardly from the first portion 42. The retention member(s) 38 is movable between the initial position from which the first portion 42 of the retention member(s) 38 elastically deforms from the original configuration as the tab 48 is inserted into the opening 20, and the final position at which the first portion 42 of the retention member(s) 38 has elastically deformed back toward the original configuration once the tab 48 has passed beyond the opening 20 such that the second portion 44 directly engages the support 18 inside the opening 20 to prevent the rotation of the body 26, and in certain embodiments the clip 22A-G, relative to the support 18.

The tab 48 of the retention member(s) 38 can include a sloped surface 50 that increases in thickness as the sloped surface 50 extends away from the distal end 46. The sloped surface 50 aids in inserting the retention member(s) 38 through the opening 20 of the support 18 and/or aids in deforming or deflecting the retention member(s) 38 during insertion through the opening 20. For each of the embodiments, the first portion 42 of the retention member(s) 38 deforms or deflects along the sloped surface 50 when the first portion 42 is in the initial position, and the first portion 42 of the retention member(s) 38 deforms or deflects back when the tab 48 passes beyond the opening 20 to the final position such that the second portion 44 engages the support 18 inside the opening 20. In certain embodiments, the first portion 42 of the retention member(s) 38 deforms or deflects back toward the original configuration when the sloped surface 50 passes beyond the opening 20 to the final position such that the second portion 44 directly engages the support 18 inside the opening 20. Once the tab(s) 48 passes beyond the opening 20, the tab(s) 48 overlap a portion of the support 18 to prevent removal of the body 26, and in certain embodiments the clip 22A-G, from the support 18. Simply stated, the configuration of the retention member(s) 38 provides a low insertion force when attaching the body 26, and in certain embodiments the clip 22A-G, to the support 18 and a high retention force to maintain the position of the body 26, and in certain embodiments the clip 22A-G, relative to the support 18.

For each of the embodiments, the body 26, and in certain embodiments the clip 22A-G, can include a stop 52 extending from a same side of the body 26 as the retention member(s) 38. The stop 52 is configured to limit movement of the retention member(s) 38 through the opening 20 and/or configured to indicate that the retention member(s) 38 is properly positioned through the opening 20. In certain embodiments, the body 26, and in certain embodiments the clip 22G, includes solely one stop 52; and in other embodiments, the stop 52 is further defined as a plurality of stops 52 spaced from each other, and each of the stops 52 can extend from the same side of the body 26 as the retention member(s) 38. One or more of the stops 52 can engage the support 18 to prevent over-insertion of the retention member(s) 38 and/or to indicate that the retention member(s) 38 is properly positioned through the opening 20.

Each of the stops 52 can include an outer edge 54 spaced from the body 26. The outer edge 54 of the stops 52 is engageable with the support 18 to limit movement of the retention member(s) 38 through the opening 20. Each of the stops 52 can further include a respective plurality of side edges 56 each adjoining the respective outer edge 54 and the body 26. The side edges 56 of the stops 52 each have a tapered surface 58 to create a space configured to assist in detaching the clip 22A-G from the support 18. For example, a tool 60 (shown schematically in phantom lines in FIG. 8 for illustrative purposes only) can engage the tapered surface 58 of one or both of the side edges 56 to apply a force to the body 26 to detach the body 26 from the support 18. Alternatively, the tool 60 can be inserted between the stops 52 to apply a force to the body 26 to detach the body 26 from the support 18. The tapered surface(s) 58 and the tool 60 can be utilized in any of the configurations of the clip 22A-G discussed herein.

Figure 3:
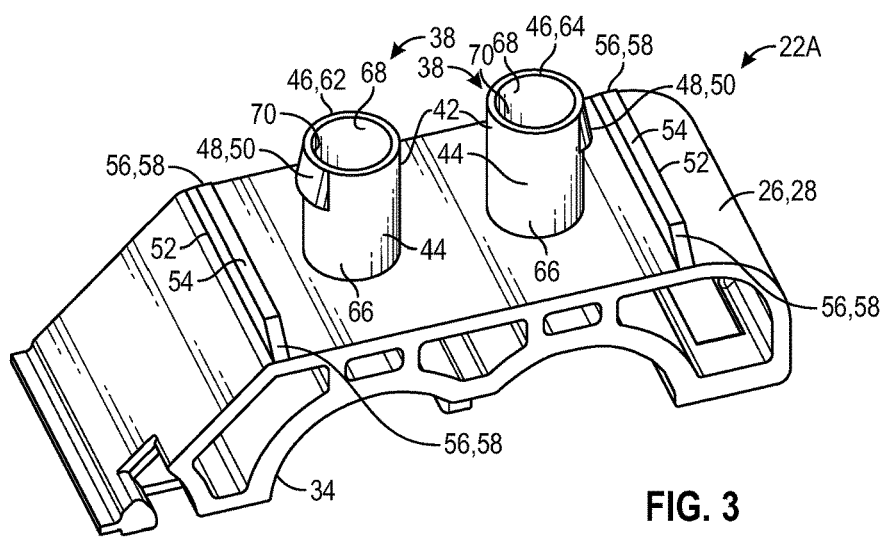
FIG. 3 is a schematic perspective view of part of the clip of a first configuration.
Figure 4:
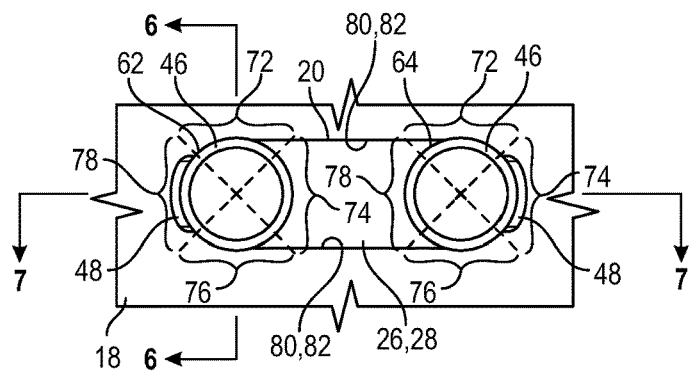
FIG. 4 is a schematic side view of the clip of FIG. 3 attached to a support.

Referring to FIGS. 3 and 4, the body 26, and in certain embodiments the clip 22A, having a first configuration is shown. In this embodiment, the retention member 38 is further defined as a plurality of retention members 38 spaced from each other. Specifically, a pair of retention members 38 are illustrated in FIGS. 3 and 4. Each of the retention members 38 includes the first portion 42 and the second portion 44 respectively, each of the retention members 38 extend to the respective distal end 46 and each of the retention members 38 movable between the initial and final positions, as discussed above. In this embodiment, the retention members 38 are further defined as a first tube 62 and a second tube 64 spaced from the first tube 62. The first and second tubes 62, 64 each include the distal end 46 and the first and second portions 42, 44.

Continuing with the first configuration, the tab 48 is further defined as a plurality of tabs 48. Each of the retention members 38 can include solely a respective one of the plurality of tabs 48 extending from the first portion 42 of the respective retention members 38. Said differently, solely one tab 48 extends from the first tube 62 and solely one other tab 48 extends from the second tube 64. As such, each respective retention member 38 can include a single respective one of the plurality of tabs 48 extending from the first portion 42 of the respective retention member 38. The tabs 48 of the respective retention members 38 can each include the sloped surface 50 as discussed above.

Generally, the first portion 42 of the retention members 38 can each deform or deflect along the sloped surface 50 of the respective retention members 38 when the first portion 42 of the retention members 38 are in the initial position. The first portion 42 of the retention members 38 can each deform or deflect back when the tabs 48 of the respective retention members 38 pass beyond the opening 20 to the final position such that the second portion 44 of the respective retention members 38 engages the support 18 inside the opening 20. As such, the first portion 42 of the retention members 38 can each deform or deflect back toward the original configuration when the sloped surface 50 of the respective retention members 38 pass beyond the opening 20 to the final position such that the second portion 44 of the respective retention members 38 directly engages the support 18 inside the opening 20.

The first and second tubes 62, 64 can each include an outer surface 66 and an inner surface 68 opposing the respective outer surface 66. The outer surface 66 of the respective tubes 62, 64 surrounds the inner surface 68 of the respective tubes 62, 64. One of the tabs 48 extends from the outer surface 66 of the respective tubes 62, 64. Said differently, the one tab 48 of the first tube 62 extends from the outer surface 66 of the first tube 62, and the one tab 48 of the second tube 64 extends from the outer surface 66 of the second tube 64. The inner surface 68 of each of the tubes 62, 64 can define a chamber 70. The chamber 70 of each of the tubes 62, 64 assists in allowing the tubes 62, 64 to deform or deflect. The tubes 62, 64 can be any suitable configuration; and as one non-limiting example, the outer surface 66 of the first and second tubes 62, 64 each defines a circular configuration.

Generally, as best shown in FIG. 4, the one tab 48 of the first tube 62 and the one tab 48 of the second tube 64 face in opposite directions from each other. The outer surface 66 of the first tube 62 can define a first region 72, a second region 74, a third region 76 and a fourth region 78. Similarly, the outer surface 66 of the second tube 64 can define a first region 72, a second region 74, a third region 76 and a fourth region 78. The first and third regions 72, 76 of the first tube 62 oppose each other, and the second and fourth regions 74, 78 of the first tube 62 oppose each other. Similarly, the first and third regions 72, 76 of the second tube 64 oppose each other, and the second and fourth regions 74, 78 of the second tube 64 oppose each other. The first, second, third and fourth regions 72, 74, 76, 78 of the first tube 62 are substantially parallel to the respective first, second, third and fourth regions 72, 74, 76, 78 of the second tube 64. In certain embodiments, the regions 72, 74, 76, 78 of the tubes 62, 64 are in sequence in a clockwise or counterclockwise direction. As best shown in FIG. 3, the one tab 48 of the first tube 62 is disposed along the fourth region 78 of the first tube 62, and the one tab 48 of the second tube 64 is disposed along the second region 74 of the second tube 64.

Figure 5:
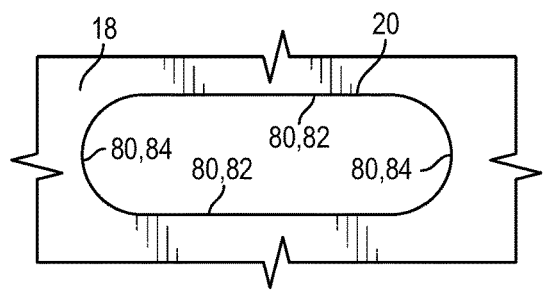
FIG. 5 is a schematic side view of the support defining an opening of FIG. 4 in which part of the clip is inserted into.

Continuing with this embodiment, the opening 20 of the support 18 can be in certain configurations. For example, as best shown in FIG. 5, the opening 20 of the support 18 is defined by a periphery 80, and the periphery 80 has a plurality of sides 82 and a plurality of ends 84 cooperating with the sides 82. In certain embodiments, the sides 82 oppose each other, and the ends 84 oppose each other. Therefore, in certain embodiments, the sides 82 can be substantially parallel to each other and the ends 84 can be substantially parallel to each other. As one non-limiting example, the sides 82 can be a substantially flat configuration and the ends 84 can be a curved configuration.

Due to the location of the tabs 48 for this embodiment, the one tab 48 of the first tube 62 engages one of the ends 84 of the periphery 80 when in the initial position and the one tab 48 of the second tube 64 engages another one of the ends 84 of the periphery 80 when in the initial position. In certain embodiments, the one tab 48 of the first tube 62 directly engages one of the ends 84 of the periphery 80 when in the initial position and the one tab 48 of the second tube 64 directly engages another one of the ends 84 of the periphery 80 when in the initial position.

Figure 6:
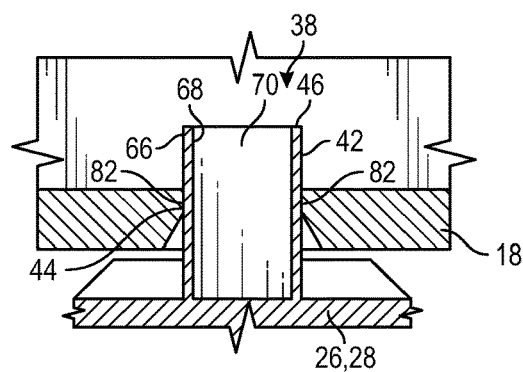
FIG. 6 is a schematic fragmentary cross-sectional view of the clip taken from lines 6-6 of FIG. 4.
Figure 7:
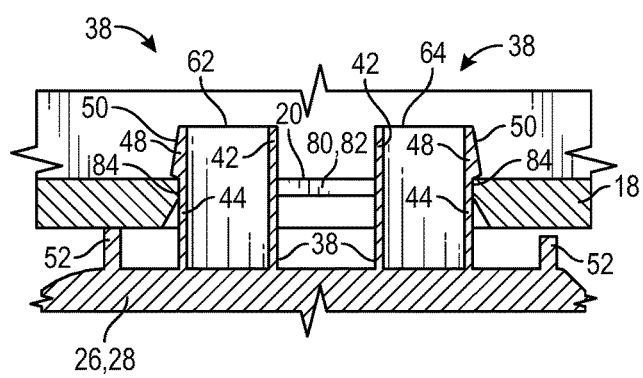
FIG. 7 is a schematic fragmentary cross-sectional view of the clip taken from lines 7-7 of FIG. 4.

Once the tabs 48 of the respective tubes 62, 64 pass beyond the opening 20, the tubes 62, 64 deform or deflect back such that a portion of the tab 48 overlaps a portion of the support 18 which prevents removal of the clip 22A from the support 18. As shown in FIGS. 6 and 7, the second portion 44 of the tubes 62, 64 engage the support 18 inside the opening 20; and more specifically the outer surface 66 (along the second portion 44) of the first tube 62 along the first and third regions 72, 76 of the first tube 62 engage the sides 82 of the periphery 80 when the one tab 48 of the first tube 62 passes beyond the opening 20 to prevent the rotation of the clip 22A relative to the support 18; and the outer surface 66 (along the second portion 44) of the second tube 64 along the first and third regions 72, 76 engage the sides 82 of the periphery 80 when the one tab 48 of the second tube 64 passes beyond the opening 20 to prevent the rotation of the clip 22A relative to the support 18. As such, the outer surface 66 of the first tube 62 along the first and third regions 72, 76 of the first tube 62 directly engages the sides 82 of the periphery 80 when the one tab 48 of the first tube 62 passes beyond the opening 20 to prevent the rotation of the clip 22A relative to the support 18 when in the final position. Furthermore, the outer surface 66 of the second tube 64 along the first and third regions 72, 76 directly engages the sides 82 of the periphery 80 when the one tab 48 of the second tube 64 passes beyond the opening 20 to prevent the rotation of the clip 22A relative to the support 18 when in the final position. The outer surface 66 of the first and second tubes 62, 64 along the first and third regions 72, 76 respectively creates an interference fit with the sides 82 of the periphery 80, which prevents the clip 22A from rotating relative to the support 18. Additionally, spacing the first and second tubes 62, 64 apart, with the interference fit discussed above, assists in preventing the clip 22A from rotating.

Continuing with the first configuration, the retention members 38 are disposed between the stops 52. Specifically, the first and second tubes 62, 64 are disposed between the stops 52. One or more of the stops 52 can remain engaged with the support 18 after the retention members 38 have been inserted through the opening 20 and/or one or more of the stops 52 can disengage from the support 18 after the retention members 38 have been inserted through the opening 20. If the stops 52 can disengage from the support 18, the clip 22A is allowed some axial movement through the opening 20. For illustrative purposes only, FIG. 7 illustrates one of the stops 52 maintaining engagement with the support 18 and another one of the stops 52 disengaged from the support 18. It is to be appreciated that both stops 52 can remain engaged with the support 18 or both of the stops 52 can disengage from the support 18. It is to also be appreciated that the cross-sectional configuration of the stops 52 relative to the support 18 of FIG. 7 also applies to all of the other configurations described herein.

Figure 8:
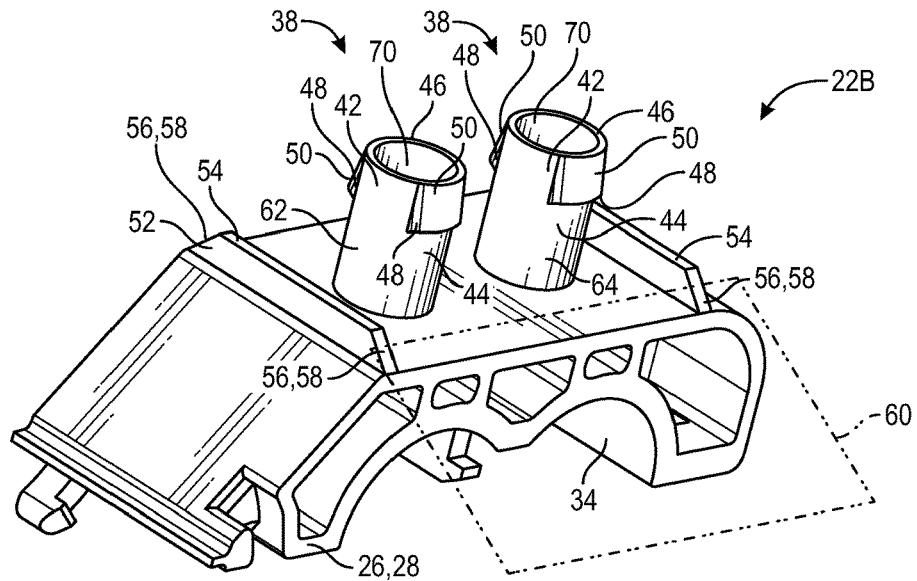
FIG. 8 is a schematic perspective view of part of the clip of a second configuration.

Referring to FIG. 8, a second configuration of the body 26, and in certain embodiments the clip 22B, is illustrated, that again utilizes a plurality of retention members 38. Specifically, the clip 22B includes the first and second tubes 62, 64 discussed above for the first configuration. Therefore, the tubes 62, 64 each include the outer and inner surfaces 66, 68, the chamber 70 and the regions 72, 74, 76, 78, which will not be re-discussed. The difference between the first and second configurations of the clip 22A, 22B is the number of tabs 48 that are utilized and the location of the tabs 48. Therefore, the above discussion for the first configuration of the clip 22A applies to the second configuration of the clip 22B except for the number of tabs 48 being utilized.

In this embodiment, the tab 48 is further defined as a plurality of tabs 48. Each of the retention members 38 can include a respective pair of the tabs 48 opposing each other respectively. Specifically, each of the respective pair of tabs 48 extends from the first portion 42 of the respective retention members 38. More specifically, the respective pair of tabs 48 of the respective tubes 62, 64 extends from the outer surface 66 of the respective tubes 62, 64. Furthermore, each of the pair of tabs 48 of the respective retention members 38 can include the sloped surface 50. The first portion 42 of the retention members 38 can each deform or deflect along the sloped surface 50 of the pair of tabs 48 of the respective retention members 38 when the first portion 42 of the retention members 38 are in the initial position. The first portion 42 of the retention members 38 can deform or deflect back when the pair of tabs 48 of the respective retention members 38 pass beyond the opening 20 to the final position such that the second portion 44 of the respective retention members 38 engages the support 18 inside the opening 20.

Figure 9:
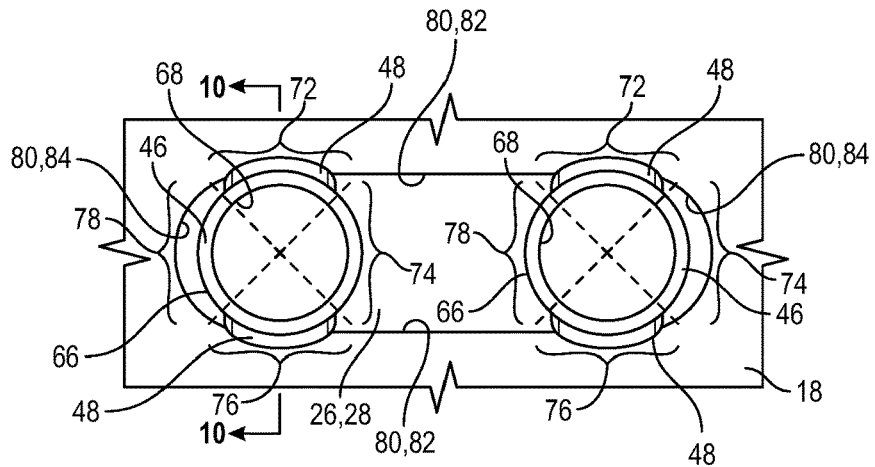
FIG. 9 is a schematic side view of the clip of FIG. 8 attached to the support.
Figure 11:
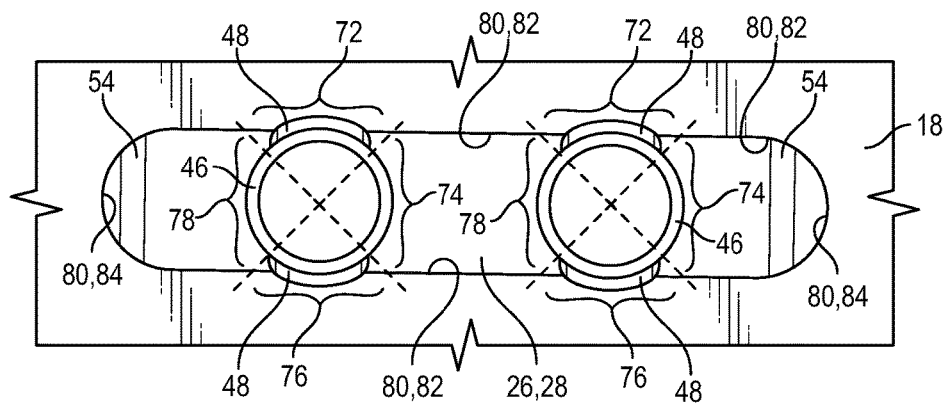
FIG. 11 is a schematic side view of the clip having a plurality of retention members spaced differently relative to the support as compared to FIG. 9.

The location of the tabs 48 for the clip 22B of FIGS. 8, 9 and 11 are different from the location of the tabs 48 of FIG. 3. Referring to FIG. 9, generally, one of the tabs 48 of the first tube 62 is substantially parallel to one of the tabs 48 of the second tube 64, and another one of the tabs 48 of the first tube 62 is substantially parallel to another one of the tabs 48 of the second tube 64. Specifically, in certain embodiments, one of the pair of tabs 48 of the first tube 62 is disposed along the first region 72 of the first tube 62 and another one of the pair of tabs 48 of the first tube 62 is disposed along the third region 76 of the first tube 62. Also, in certain embodiments, one of the pair of tabs 48 of the second tube 64 is disposed along the first region 72 of the second tube 64 and another one of the pair of tabs 48 of the second tube 64 is disposed along the third region 76 of the second tube 64.

As shown in FIGS. 9 and 11, the first and second tubes 62, 64 are spaced from the ends 84 of the periphery 80, i.e., the tubes 62, 64 do not engage the ends 84 as compared to the configuration of FIG. 3. Therefore, the opening 20 of the support 18 can be substantially the same configuration as discussed above for the clip 22A of the first configuration or can be elongated more than illustrated in FIG. 5; and/or the first and second tubes 62, 64 can be closer together than the first configuration such that the tubes 62, 64 are spaced from the ends 84. Furthermore, optionally, the opening 20 can be narrower or wider than illustrated, and for illustrative purposes only, FIG. 11 illustrates the opening 20 narrower than the opening 20 of FIG. 9. When changing the opening 20, the outer surface 66 of the tubes 62, 64 can correspondingly change to a larger or smaller outer diameter (compare FIGS. 9 and 11).

Figure 10:
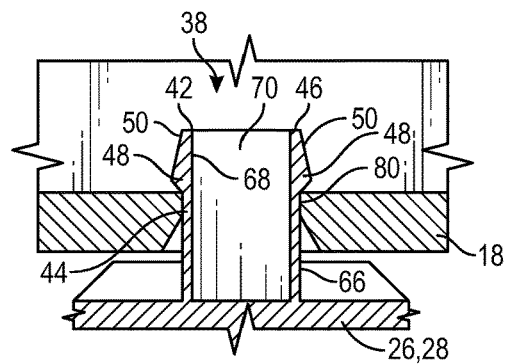
FIG. 10 is a schematic fragmentary cross-sectional view of the clip taken from lines 10-10 of FIG. 9.

Even though FIG. 10 illustrates the cross-section of one of the tubes 62, it is to be appreciated that both of the tubes 62, 64 would have the same cross-sectional configuration for FIGS. 8, 9 and 11, and therefore, will not be duplicated. FIG. 10 illustrates the second portion 44 of the respective retention members 38 engaging the support 18 inside the opening 20 for the second configuration of the clip 22B. Hence, the second portion 44 of the respective retention members 38 are disposed between the tabs 48 and the body 26.

One of the pair of tabs 48 of the first tube 62 engages one of the sides 82 of the periphery 80 and another one of the pair of tabs 48 of the first tube 62 engages another one of the sides 82 of the periphery 80 when in the initial position. In certain embodiments, one of the pair of tabs 48 of the first tube 62 directly engages one of the sides 82 of the periphery 80 and another one of the pair of tabs 48 of the first tube 62 directly engages another one of the sides 82 of the periphery 80 when in the initial position. Furthermore, one of the pair of tabs 48 of the second tube 64 engages one of the sides 82 of the periphery 80 and another one of the pair of tabs 48 of the second tube 64 engages another one of the sides 82 of the periphery 80 when in the initial position. Therefore, in certain embodiments, one of the pair of tabs 48 of the second tube 64 directly engages one of the sides 82 of the periphery 80 and another one of the pair of tabs 48 of the second tube 64 directly engages another one of the sides 82 of the periphery 80 when in the initial position.

Referring to FIG. 10, the outer surface 66 of the first tube 62 along the first and third regions 72, 76 of the first tube 62 engages the sides 82 of the periphery 80 when the pair of tabs 48 of the first tube 62 passes beyond the opening 20 to prevent the rotation of the clip 22B relative to the support 18, and the outer surface 66 of the second tube 64 along the first and third regions 72, 76 engages the sides 82 of the periphery 80 when the pair of tabs 48 of the second tube 64 passes beyond the opening 20 to prevent the rotation of the clip 22B relative to the support 18. In certain embodiments, the outer surface 66 of the first tube 62 along the first and third regions 72, 76 of the first tube 62 directly engages the sides 82 of the periphery 80 when the pair of tabs 48 of the first tube 62 passes beyond the opening 20 to prevent the rotation of the clip 22B relative to the support 18 when in the final position. Furthermore, the outer surface 66 of the second tube 64 along the first and third regions 72, 76 directly engages the sides 82 of the periphery 80 when the pair of tabs 48 of the second tube 64 passes beyond the opening 20 to prevent the rotation of the clip 22B relative to the support 18 when in the final position.

Continuing with the second configuration of FIG. 8, the retention members 38 are disposed between the stops 52. Specifically, the first and second tubes 62, 64 are disposed between the stops 52. It is to also be appreciated that the discussion of the stops 52 of FIG. 7 and the cross-sectional configuration of the stops 52 relative to the support 18 of FIG. 7 also applies to the second configuration.

Figure 12:
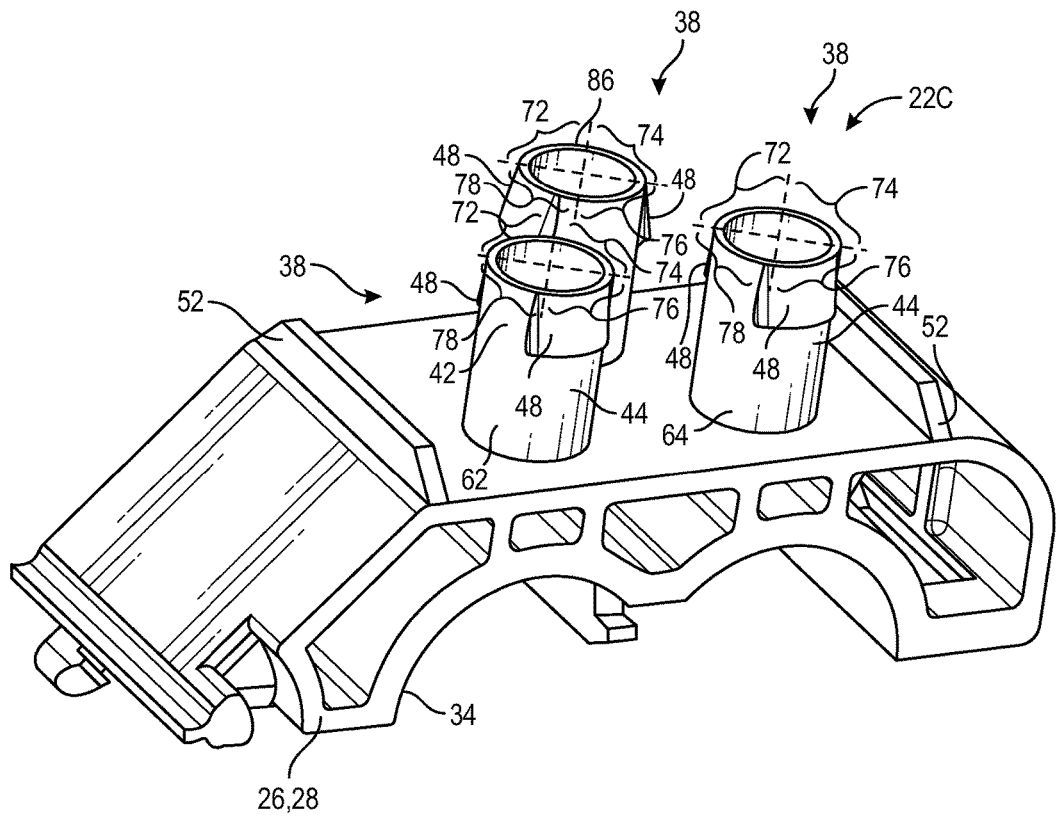
FIG. 12 is a schematic perspective view of part of the clip of a third configuration.

Referring to FIG. 12, the body 26, and in certain embodiments the clip 22C, having a third configuration is shown, that again utilizes a plurality of retention members 38. Specifically, the clip 22C includes the first and second tubes 62, 64 discussed above for the second configuration, and the number of tabs 48 and location of the tabs 48 for the first and second tubes 62, 64 for this embodiment are the same as the discussion for the second configuration. The difference between the second and third configurations of the clip 22B, 22C is the number of tubes 62, 64 that are utilized. Therefore, the above discussion for the second configuration of the clip 22B applies to the third configuration of the clip 22C except the third configuration includes one or more additional tubes.

Continuing with the third configuration, the retention members 38 can further include a third tube 86 spaced from the first and second tubes 62, 64. The third tube 86 can include the distal end 46, the pair of tabs 48, the first and second portions 42, 44 and the outer and inner surfaces 66, 68 as discussed above. Furthermore, the outer surface 66 of the third tube 86 can define a first region 72, a second region 74, a third region 76 and a fourth region 78, with the first and third regions 72, 76 of the third tube 86 opposing each other, and the second and fourth regions 74, 78 of the third tube 86 opposing each other. As shown in FIG. 12, one of the pair of tabs 48 of the third tube 86 is disposed along the second region 74 of the third tube 86 and another one of the pair of tabs 48 of the third tube 86 is disposed along the fourth region 78 of the third tube 86. In this embodiment, the pair of tabs 48 of the first and second tubes 62, 64 is disposed in substantially a same orientation relative to each other, and the pair of tabs 48 of the third tube 86 is disposed in a transverse orientation relative to the pair of tabs 48 of the first and second tubes 62, 64. In certain embodiments, the pair of tabs 48 of the third tube 86 is disposed in a substantially perpendicular orientation relative to the pair of tabs 48 of the first and second tubes 62, 64.

The opening 20 of the support 18 can be changed for the number of tubes 62, 64, 86 being utilized. For example, when utilizing three tubes 62, 64, 86 in the orientation of FIG. 12, the periphery 80 of the opening 20 can again have the plurality of sides 82 and the plurality of ends 84 cooperating with the sides 82. In the embodiment of FIG. 12, three separate openings 20 having the periphery 80, the sides 82 and ends 84 can be utilized, with one of the tubes 62, 64, 86 disposed through respective openings 20. Alternatively, one opening 20 having the periphery 80 can include three sides 82 and three ends 84 to correspond to the configuration of the tubes 62, 64, 86; therefore, each of the ends 84 can wrap around corresponding tubes 62, 64, 86.

Continuing with the third configuration of FIG. 12, the retention members 38 are disposed between the stops 52. Specifically, the first, second and third tubes 62, 64, 86 are disposed between the stops 52. It is to also be appreciated that the discussion of the stops 52 of FIG. 7 and the cross-sectional configuration of the stops 52 relative to the support 18 of FIG. 7 also applies to the third configuration.

Figure 13:
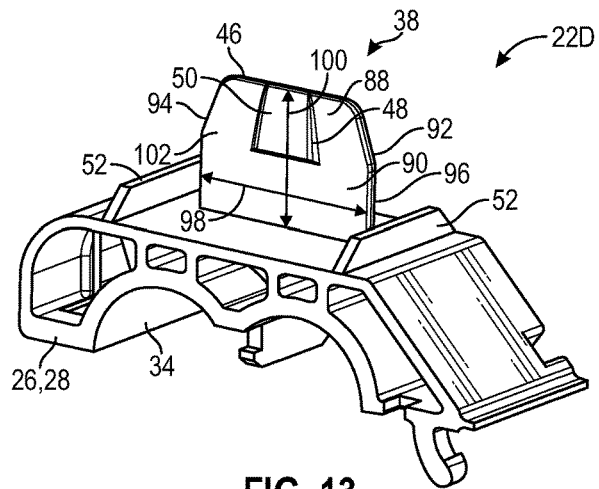
FIG. 13 is a schematic perspective view of part of the clip of a fourth configuration.

Referring to FIG. 13, the body 26, and in certain embodiments the clip 22D, having a fourth configuration is shown. In this embodiment, a single retention member 38 is utilized. The retention member 38 is further defined as an elongated member 88 having a first side 90 and a second side 92 opposing each other. Simply stated, the retention member 38 of FIG. 13 is not a tube 62, 64, 86 as illustrated in FIGS. 3, 8 and 12. As such, the elongated member 88 does not define the chamber 70.

The elongated member 88 extends to the distal end 46 as discussed above. The elongated member 88 includes the tab 48 and the sloped surface 50 as discussed above. In this embodiment, solely one tab 48 extends from the elongated member 88. As such, a single tab 48 extends outwardly from the elongated member 88. The sloped surface 50 of the tab 48 increases in thickness toward the body 26.

The elongated member 88 can include a first end 94 and a second end 96 spaced from each other along a length 98 of the elongated member 88. The length 98 is transverse to a height 100 of the elongated member 88 between the body 26 and the distal end 46. In certain embodiments, the height 100 is substantially perpendicular to the length 98 of the elongated member 88.

Figure 14:
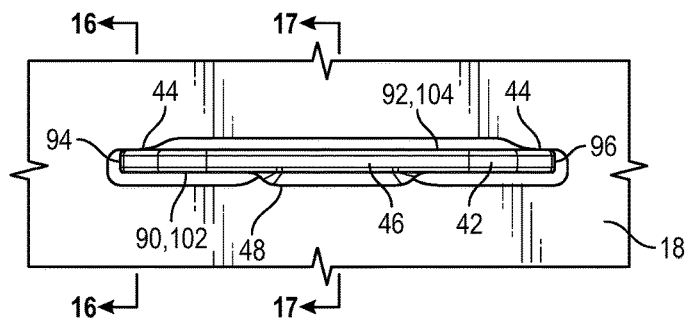
FIG. 14 is a schematic side view of the clip of FIG. 13 attached to the support.

Referring to FIGS. 13 and 14, the first side 90 can include a flat portion 102, and the tab 48 extends from the first side 90. The flat portion 102 of the first side 90 can be disposed adjacent to a portion of the tab 48. The second side 92 can include a flat portion 104.

Figure 15:
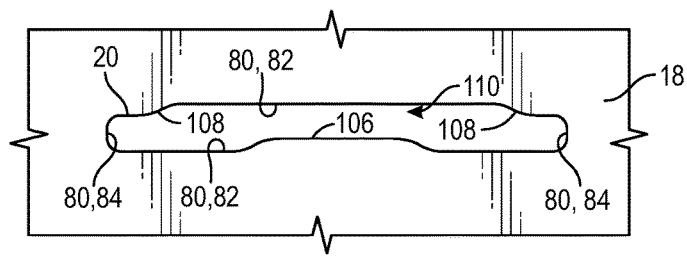
FIG. 15 is a schematic side view of the support defining the opening of FIG. 14 in which part of the clip is inserted into.

The opening 20 of the support 18 can be changed as best shown in FIG. 15. Again, the periphery 80 has the plurality of sides 82 and the plurality of ends 84 cooperating with the sides 82. In this configuration, one of the sides 82 of the periphery 80 can include a first protrusion 106 extending toward the opposite side 82 of the periphery 80 and the other side 82 of the periphery 80 can include a plurality of second protrusions 108 extending toward the side 82 with the first protrusion 106. Generally, the second protrusions 108 are spaced from each other, and the first protrusion 106 is disposed between the second protrusions 108 in a substantially parallel relationship to create a narrow portion 110 of the opening 20.

Figures 16, 17:
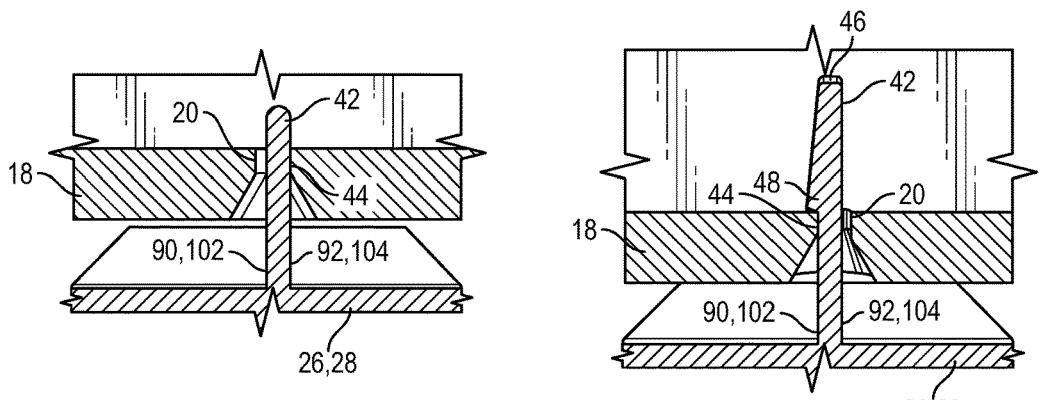
FIG. 16 is a schematic fragmentary cross-sectional view of the clip taken from lines 16-16 of FIG. 14.
FIG. 17 is a schematic fragmentary cross-sectional view of the clip taken from lines 17-17 of FIG. 14.

As the elongated member 88 is inserted into the opening 20, the tab 48 engages the first protrusion 106 in the narrow portion 110 which causes the elongated member 88 to deform or deflect. In certain embodiments, the tab 48 directly engages the first protrusion 106 in the narrow portion 110 which causes the elongated member 88 to deform or deflect in the initial position. Once the tab 48 passes beyond the opening 20, the tab 48 deforms or deflects back such that the second portion 44 engages the support 18; and as shown in FIGS. 14, 16 and 17, the second portion 44 engages the second protrusions 108 along the second side 92 of the elongated member 88 and engages the first protrusion 106 along the first side 90 of the elongated member 88. As such, once the tab 48 passes beyond the opening 20, the tab 48 deforms or deflects back toward the original configuration such that the second portion 44 directly engages the support 18 in the final position. Therefore, the flat portion 104 of the second side 92 of this configuration engages one of the sides 82 of the periphery 80 and the flat portion 102 of the first side 90 engages another one of the sides 82 of the periphery 80. As such, the flat portion 104 of the second side 92 of this configuration directly engages one of the sides 82 of the periphery 80, and the flat portion 102 of the first side 90 directly engages another one of the sides 82 of the periphery 80. Specifically, the flat portion 104 of the second side 92 engages the second protrusions 108 of the periphery 80 and the flat portion 102 of the first side 90 engages the first protrusion 106 of the periphery 80. The engagement along the second side 92 of the elongated member 88 is spaced apart, e.g., adjacent to the ends 84 of the periphery 80, which prevents rotation of the clip 22D relative to the support 18.

Continuing with the fourth configuration of FIG. 13, the retention member 38 is disposed between the stops 52. Specifically, the elongated member 88 is disposed between the stops 52. The first end 94 of the elongated member 88 faces one of the stops 52 and the second end 96 of the elongated member 88 faces another one of the stops 52. Generally, the elongated member 88 is disposed in a transverse orientation relative to an orientation of the stops 52. In certain embodiments, the elongated member 88 is disposed in a substantially perpendicular orientation relative to an orientation of the stops 52. It is to also be appreciated that the discussion of the stops 52 of FIG. 7 and the cross-sectional configuration of the stops 52 relative to the support 18 of FIG. 7 also applies to the fourth configuration.

Referring to FIG. 18, a fifth configuration of the body 26, and in certain embodiments the clip 22E, is illustrated, that utilizes a plurality of retention members 38. The retention members 38 are further defined as a plurality of elongated members 88. Specifically, the clip 22E includes a plurality of elongated members 88 instead of a single elongated member 88 as discussed above for the fourth configuration. The elongated members 88 are configured the same as discussed above for the fourth configuration except for the orientation of the elongated members 88. Therefore, the discussion above for the elongated member 88 of the fourth configuration applies to the plurality of elongated members 88 of the fifth configuration. Furthermore, the configuration of the opening 20 is the same as discussed above for the fourth configuration except that there are a plurality of openings 20 instead of solely one opening 20. Therefore, the discussion above for the opening 20 of the fourth configuration also applies to the plurality of openings 20 of the fifth configuration.

In the configuration of FIGS. 18 and 19, each of the elongated members 88 includes solely one tab 48, and the tabs 48 face in opposite directions relative to each other. As such, a single tab 48 extends outwardly from each of the elongated members 88. Furthermore, the first protrusion 106 of the respective periphery 80 (of the openings 20) faces in opposite directions relative to each other. Engagement of the elongated members 88 with the respective openings 20 is the same as discussed above for the fourth configuration.

Referring to FIG. 18, in this embodiment, the stops 52 are disposed between the elongated members 88. Additionally, the elongated members 88 and the stops 52 are disposed in a substantially parallel orientation relative to each other. It is to also be appreciated that the discussion of the stops 52 of FIG. 7 and the cross-sectional configuration of the stops 52 relative to the support 18 of FIG. 7 also applies to the fifth configuration.

Referring to FIG. 20, a sixth configuration of the body 26, and in certain embodiments the clip 22F, is illustrated. In this embodiment, a single retention member 38 is utilized. The retention member 38 is further defined as the elongated member 88 as discussed above for the fourth configuration. The elongated member 88 of the sixth configuration is the same as the elongated member 88 of the fourth configuration except for the contour of the first and second sides 90, 92. In other words, the first and second sides 90, 92 are not substantially flat. Furthermore, the configuration of the opening 20 is different for the sixth configuration as compared to the opening 20 utilized in the fourth configuration. In this embodiment, the opening 20 (as best shown in FIG. 21) is configured substantially the same as FIG. 5 except the opening 20 of FIG. 21 is narrower than FIG. 5, and optionally is longer than FIG. 5. Therefore, the opening 20 will not be re-discussed.

The elongated member 88 extends to the distal end 46 as discussed above. The elongated member 88 includes the tab 48 and the sloped surface 50 as discussed above. In this embodiment, solely one tab 48 extends from the elongated member 88. As such, a single tab 48 extends outwardly from the elongated member 88. The sloped surface 50 of the tab 48 increases in thickness toward the body 26.

Figure 23:
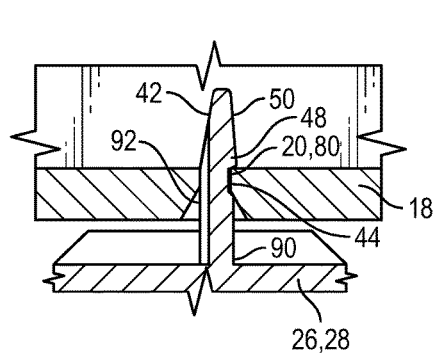
FIG. 23 is a schematic fragmentary cross-sectional view of the clip taken from lines 23-23 of FIG. 22.

Referring to FIGS. 20 and 22, the tab 48 extends from the second side 92. The first side 90 can include a concave portion 112 and the second side 92 can include a convex portion 114. As the elongated member 88 is inserted into the opening 20, the tab 48 engages one of the sides 82 of the periphery 80 (which the sides 82 of the periphery 80 are substantially flat relative to each other), which causes the elongated member 88 to deform or deflect. In certain embodiments, the tab 48 directly engages one of the sides 82 of the periphery 80, which causes the elongated member 88 to deform or deflect when in the initial position. Once the tab 48 passes beyond the opening 20, the tab 48 deforms or deflects back such that the second portion 44 engages the support 18. As such, the first side 90 directly engages one of the sides 82 of the periphery 80 and the second side 92 directly engages another one of the sides 82 of the periphery 80 when in the final position. As shown in FIGS. 22 and 23, the second portion 44 engages one of the sides 82 of the periphery 80 in two places in a spaced apart location and engages the other one of the sides 82 of the periphery 80 in one location. Therefore, the concave portion 112 of the first side 90 engages one of the sides 82 of the periphery 80 in the two places and the convex portion 114 of the second side 92 engages another one of the sides 82 of the periphery 80 in one location. The engagement along the first side 90 of the elongated member 88 is spaced apart, e.g., adjacent to the ends 84 of the periphery 80, which prevents rotation of the clip 22F relative to the support 18.

Continuing with the sixth configuration of FIG. 20, the retention member 38 is disposed between the stops 52. Specifically, the elongated member 88 is disposed between the stops 52. The first end 94 of the elongated member 88 faces one of the stops 52 and the second end 96 of the elongated member 88 faces another one of the stops 52. Generally, the elongated member 88 is disposed in a transverse orientation relative to an orientation of the stops 52. In certain embodiments, the elongated member 88 is disposed in a substantially perpendicular orientation relative to an orientation of the stops 52. It is to also be appreciated that the discussion of the stops 52 of FIG. 7 and the cross-sectional configuration of the stops 52 relative to the support 18 of FIG. 7 also applies to the sixth configuration.

Figure 24:
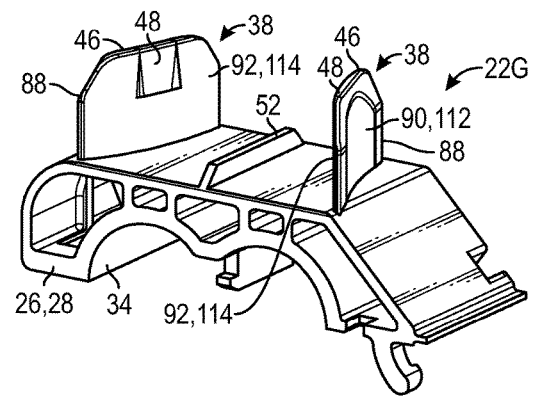
FIG. 24 is a schematic perspective view of part of the clip of a seventh configuration.

Referring to FIG. 24, a seventh configuration of the body 26, and in certain embodiments the clip 22G, is illustrated, that utilizes a plurality of retention members 38. The retention members 38 are further defined as a plurality of elongated members 88. Specifically, the clip 22G includes a plurality of elongated members 88 instead of a single elongated member 88 as discussed above for the sixth configuration. The elongated members 88 are configured the same as discussed above for the sixth configuration except for the orientation of the elongated members 88. Therefore, the discussion above for the elongated member 88 of the sixth configuration applies to the plurality of elongated members 88 of the seventh configuration. Furthermore, the configuration of the opening 20 is the same as discussed above for the sixth configuration except that there are a plurality of openings 20 instead of solely one opening 20. Therefore, the discussion above for the opening 20 of the sixth configuration also applies to the plurality of openings 20 of the seventh configuration.

Figure 25:
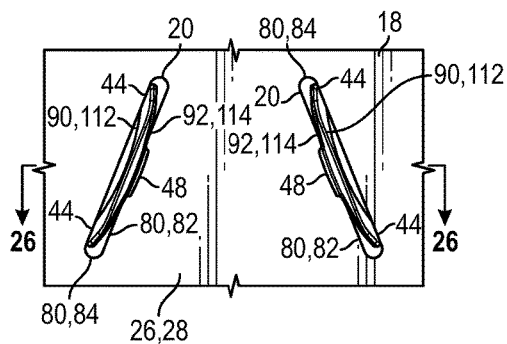
FIG. 25 is a schematic side view of the clip of FIG. 24 attached to the support.
Figure 26:
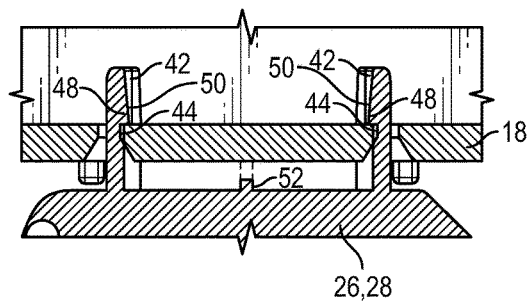
FIG. 26 is a schematic fragmentary cross-sectional view of the clip taken from lines 26-26 of FIG. 25.

In the configuration of FIGS. 24-26, each of the elongated members 88 includes solely one tab 48, and the tabs 48 face generally toward each other. As such, a single tab 48 extends outwardly from each of the elongated members 88. One of the tabs 48 extend from the second side 92 of one of the elongated members 88 and another one of the tabs 48 extend from the second side 92 of another one of the elongated members 88. Additionally, the first side 90 of each of the elongated members 88 includes the concave portion 112 and the second side 92 of each of the elongated members 88 includes the convex portion 114. The respective tabs 48 are disposed along the convex portion 114. Furthermore, the elongated members 88 are disposed in a transverse orientation relative to each other. In other words, the elongated members 88 are orientated at an angle relative to each other. Simply stated, the elongated members 88 are not parallel to each other. For example, the elongated members 88 can be orientated in generally a V-shape. Engagement of the elongated members 88 with the respective openings 20 is the same as discussed above for the sixth configuration.

Referring to FIG. 24, in this embodiment, solely one stop 52 is utilized, and the stop 52 is disposed between the elongated members 88. Additionally, the elongated members 88 and the stops 52 are disposed in a transverse orientation relative to each other. Specifically, the stop 52 can be disposed in one orientation and the elongated members 88 can be disposed in different angles relative to the stop 52. It is to also be appreciated that the discussion of the stops 52 of FIG. 7 and the cross-sectional configuration of the stops 52 relative to the support 18 of FIG. 7 also applies to the seventh configuration.

Figure 27:
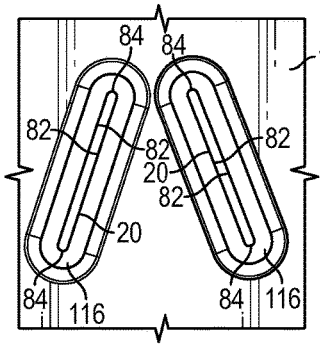
FIG. 27 is a schematic fragmentary side view of the support including a plurality of raised portions.
Figure 28:
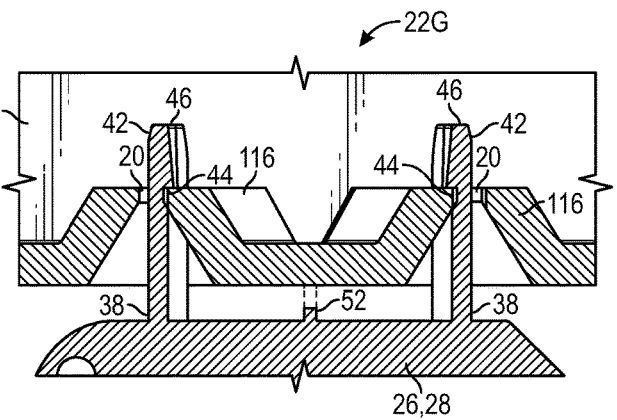
FIG. 28 is a schematic fragmentary cross-sectional view of the clip of FIG. 24 attached to the support of FIG. 27.

Referring to FIGS. 27 and 28, the support 18 can optionally include a raised portion 116 defining the opening 20. Therefore, if utilizing a plurality of openings 20, the support 18 can include a plurality of raised portions 116 defining respective openings 20. The raised portion(s) 116 provide a locating feature to attach the body 26, and in certain embodiments the clip 22A-G, to the support 18. In other words, the raised portion(s) 116 provide a user with a visual indicator, as well as, a touch indicator of where to insert the retention member(s) 38 relative to the support 18. Any of the configurations discussed herein can include the raised portion 116.

The body 26, and in certain embodiments the clips 22A-G, described herein can be formed of any suitable materials. Non-limiting examples can include metal, plastic, composites and combinations thereof.

For all of the configurations of the retention member(s) 38 described herein, the retention member(s) 38 provides a low insertion force when attaching the body 26, and in certain embodiments the clip 22A-G, to the support 18 and a high retention force to maintain the position of the body 26, and in certain embodiments the clip 22A-G, relative to the support 18. All of the retention member(s) 38 utilize elastic averaging, by deformation or deflection, to attach the body 26, and in certain embodiments the clip 22A-G, to the support 18 and prevent the rotation of the body 26, and in certain embodiments the clip 22A-G, relative to the support 18. Therefore, all of the retention member(s) 38 provide multiple points of contact to locate, self-align and retain the body 26, and in certain embodiments the clip 22A-G, relative to the support 18. The configurations of the body 26, and in certain embodiments the clip 22A-G, provide a two-way or a four-way elastic averaging system. The retention member(s) 38 described above each prevent the rotation of the body 26, and in certain embodiments the clip 22A-G, which prevents undesirable movement of the conduits 16, trim pieces, etc., reduces rattling of the clips 22A-G, trim pieces, etc. or conduits 16, and prevents excess wear of the clips 22A-G, trim pieces, etc. or conduits 16. Furthermore, the retention member(s) 38 described above ensures proper attachment of the body 26, and in certain embodiments the clip 22A-G, to the support 18, prevents undesirable engagement with other components and improves serviceability of the body 26, and in certain embodiments the clip 22A-G. The retention member(s) 38 can deform or deflect to adjust for different tolerances and thus can automatically adjust to alignment issues.

The following description is merely exemplary in nature and is not intended to limit the present disclosure, its application or uses. For example, the configurations shown are applicable to vehicle components, but the alignment system disclosed herein can be used with any suitable components to provide elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior and under hood vehicular components and applications.

As used herein, the phrase "elastically deformable", "elastically deforms", etc., refers to components, or portions of components, including component features and/or the retention member(s) 38, comprising materials having a generally elastic deformation characteristic, wherein the material is configured to undergo a resiliently reversible change in its shape, size, or both, in response to the application of a force. The force causing the resiliently reversible or elastic deformation of the material can include a tensile, compressive, shear, bending or torsional force, or various combinations of these forces. The elastically deformable materials can exhibit linear elastic deformation, for example that are described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$ wherein X is the manufacturing positional variance of the locating features of the mated components and N is the number of features inserted. To obtain elastic averaging, an elastically deformable component is configured to have at least one feature, such as the retention member(s) 38, and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates assembly and disassembly. In some configurations, the elastically deformable component configured to have the at least one feature and associated mating feature disclosed herein can require more than one of such features, depending on the requirements of a particular configuration. Positional variance of the components can result in varying forces being applied over regions of the contact surfaces that are over-constrained and engaged during insertion of the component in an interference condition. It is to be appreciated that a single inserted component can be elastically averaged with respect to a length of the perimeter of the component. The principles of elastic averaging are described in detail in commonly owned U.S. Pat. No. 8,695,201, the disclosure of which is incorporated by reference herein in its entirety. The embodiments disclosed above provide the ability to convert an existing component that is not compatible with the above-described elastic averaging principles, or that would be further aided with the inclusion of a two-way or a four-way elastic averaging system as herein disclosed, to an assembly that does facilitate elastic averaging and the benefits associated therewith.

Any suitable elastically deformable material can be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology can be employed, including all shapes and sizes of particulates or fibers. More particularly any suitable type of fiber can be used, including continuous and discontinuous fibers, woven and unwoven cloths, felts or tows, or a combination thereof. Any suitable metal can be used, including various grades and alloys of steel, cast iron, aluminum, magnesium or titanium, or composites thereof, or any other combinations thereof. Polymers can include both thermoplastic polymers or thermoset polymers, or composites thereof, or any other combinations thereof, including a wide variety of co-polymers and polymer blends. In one embodiment, a plastic material is utilized that has elastic properties so as to deform elastically without fracture, as for example, a material comprising an acrylonitrile butadiene styrene (ABS) polymer, and more particularly a polycarbonate ABS polymer blend (PC/ABS). The material can be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component can be formed in any suitable manner. For example, the elastically deformable alignment features and the associated component can be integrally formed, or can be formed entirely separately and subsequently attached together. When integrally formed, the features/components can be formed as a single part from a plastic injection molding machine, for example. When formed separately, the features/components can be formed from different materials to provide a predetermined elastic response characteristic, for example. The material, or materials, can be selected to provide a predetermined elastic response characteristic of any or all of the elastically deformable alignment features, the associated component, or the mating component. The predetermined elastic response characteristic can include, for example, a predetermined elastic modulus.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An assembly, comprising:
a support defining an opening;
a clip attachable to the support via the opening, with the clip including a body;
a retention member extending from the body and having a first portion inserted through the opening to attach the body to the support and a second portion directly engaging the support inside the opening to prevent rotation of the body relative to the support; and
wherein the retention member includes a tab and the retention member is movable between an initial position from which the first portion of the retention member elastically deforms from an original configuration as the tab is inserted into the opening and a final position at which the first portion of the retention member has elastically deformed back toward the original configuration once the tab has passed beyond the opening such that the second portion directly engages the support at a plurality of spaced apart locations inside the opening to prevent the rotation of the body relative to the support.

2. The assembly as set forth in claim 1 wherein:
the retention member includes a distal end spaced from the body, with the first portion of the retention member disposed closer to the distal end than the body;
the tab extends outwardly from the first portion;
the tab includes a sloped surface increasing in thickness as the sloped surface extends away from the distal end; and
the first portion of the retention member deforms along the sloped surface when the first portion is in the initial position, and the first portion of the retention member deforms back toward the original configuration when the sloped surface passes beyond the opening to the final position such that the second portion directly engages the support inside the opening.

3. The assembly as set forth in claim 1 wherein the clip includes a stop extending from a same side of the body as the retention member, with the stop configured to limit movement of the retention member through the opening.

4. The assembly as set forth in claim 3 wherein the stop is further defined as a plurality of stops spaced from each other, and wherein the retention member is disposed between the stops.

5. The assembly as set forth in claim 4 wherein:
each of the stops includes an outer edge spaced from the body, with the outer edge of the stops engageable with the support to limit movement of the retention member through the opening;
each of the stops includes a respective plurality of side edges each adjoining the respective outer edge and the body; and
the side edges of the stops each have a tapered surface to create a space configured to assist in detaching the clip from the support.

6. The assembly as set forth in claim 1 wherein:
the retention member is further defined as an elongated member having a first side and a second side opposing each other;
the first side includes a flat portion, and the tab extends from the first side;
the second side includes a flat portion; and
the opening of the support is defined by a periphery having a plurality of sides and a plurality of ends cooperating with the sides, with the flat portion of the second side directly engaging one of the sides of the periphery and the flat portion of the first side directly engaging another one of the sides of the periphery when in the final position.

7. The assembly as set forth in claim 6 wherein:
the clip includes a plurality of stops extending from a same side of the body as the retention member;
the elongated member is disposed between the stops; and
the elongated member is disposed in a substantially perpendicular orientation relative to an orientation of the stops.

8. The assembly as set forth in claim 6 wherein:
the elongated member is further defined as a plurality of elongated members having the first and second sides;
the clip includes a plurality of stops extending from a same side of the body as the retention member;
the stops are disposed between the elongated members; and
the elongated members and the stops are disposed in a substantially parallel orientation relative to each other.

9. The assembly as set forth in claim 1 wherein:
the retention member is further defined as an elongated member having a first side and a second side opposing each other;
the tab extends from the second side;
the first side includes a concave portion and the second side includes a convex portion;
the opening of the support is defined by a periphery having a plurality of sides and a plurality of ends cooperating with the sides, with the sides of the periphery substantially parallel to each other; and
the first side of the elongated member directly engages one of the sides of the periphery and the second side of the elongated member directly engages another one of the sides of the periphery when in the final position.

10. The assembly as set forth in claim 9 wherein:
the clip includes a plurality of stops extending from a same side of the body as the retention member;
the elongated member is disposed between the stops; and
the elongated member is disposed in a transverse orientation relative to an orientation of the stops.

11. The assembly as set forth in claim 9 wherein:
the elongated member is further defined as a plurality of elongated members having the first and second sides;
the tab is further defined as a plurality of tabs, with one of the tabs extending from the second side of one of the elongated members and another one of the tabs extending from the second side of another one of the elongated members;
the first side of each of the elongated members includes the concave portion and the second side of each of the elongated members includes the convex portion; and
the elongated members are disposed in a transverse orientation relative to each other.

12. The assembly as set forth in claim 1 wherein:
the retention member is further defined as a plurality of retention members spaced from each other, each of the retention members including a respective first portion and a respective second portion, each of the retention members extend to a respective distal end and each of the retention members is movable between the initial and final positions;
the tab is further defined as a plurality of tabs, with each respective retention member including a single respective one of the plurality of tabs extending from the first portion of the respective retention member;

the respective tabs each include a sloped surface increasing in thickness as the respective sloped surface extends away from the respective distal end;

the respective first portions of the retention members each deform along the sloped surface of the respective retention members when the first portion of the retention members are in the initial position, and the respective first portions of the retention members each deform back toward the original configuration when the sloped surface of the respective retention members passes beyond the opening to the final position such that the second portion of the respective retention members directly engages the support inside the opening;

the retention members are further defined as a first tube and a second tube spaced from the first tube;

the first and second tubes each include the distal end, one of the tabs and the first and second portions; and the first and second tubes each include an outer surface and an inner surface opposing the respective outer surface, with the outer surface of the respective tubes surrounding the inner surface of the respective tubes, and with one of the tabs extending from the outer surface of the respective tubes.

13. The assembly as set forth in claim 12 wherein the one tab of the first tube and the one tab of the second tube face in opposite directions from each other.

14. The assembly as set forth in claim 12 wherein:

the outer surface of the first tube defines a first region, a second region, a third region and a fourth region, with the first and third regions of the first tube opposing each other, and the second and fourth regions of the first tube opposing each other;

the one tab of the first tube is disposed along the fourth region of the first tube;

the outer surface of the second tube defines a first region, a second region, a third region and a fourth region, with the first and third regions of the second tube opposing each other, and the second and fourth regions of the second tube opposing each other;

the one tab of the second tube is disposed along the second region of the second tube;

the opening of the support is defined by a periphery having a plurality of sides and a plurality of ends cooperating with the sides;

the one tab of the first tube directly engages one of the ends of the periphery when in the initial position and the one tab of the second tube directly engages another one of the ends of the periphery when in the initial position; and the outer surface of the first tube along the first and third regions of the first tube directly engage the sides of the periphery when the one tab of the first tube passes beyond the opening to prevent the rotation of the clip relative to the support when in the final position, and the outer surface of the second tube along the first and third regions directly engage the sides of the periphery when the one tab of the second tube passes beyond the opening to prevent the rotation of the clip relative to the support when in the final position.

15. The assembly as set forth in claim 1 wherein:

the retention member is further defined as a plurality of retention members spaced from each other, each of the retention members including a respective first portion and a respective second portion, each of the retention members extend to a respective distal end and each of the retention members is movable between the initial and final positions;

the tab is further defined as a plurality of tabs, with each respective retention member including a respective pair of the tabs opposing each other respectively, each of the respective pair of the tabs extending from the first portion of the respective retention members;

the respective tabs each include a sloped surface increasing in thickness as the respective sloped surface extends away from the respective distal end; and the respective first portions of the retention members each deform along the sloped surface of the pair of the tabs of the respective retention members when the first portion of the retention members are in the initial position, and the respective first portions of the retention members deform back when the pair of the tabs of the respective retention members passes beyond the opening to the final position such that the second portion of the respective retention members directly engages the support inside the opening.

16. A clip assembly for retaining a conduit, the assembly comprising:

a support defining an opening;

a clip attachable to the support via the opening, with the clip including a body configured to retain the conduit;

wherein:

the clip includes a retention member extending from the body and having a first portion inserted through the opening to attach the clip to the support and a second portion directly engaging the support inside the opening to prevent rotation of the clip relative to the support;

the retention member includes a tab and the retention member is movable between an initial position from which the first portion of the retention member elastically deforms from an original configuration as the tab is inserted into the opening and a final position at which the first portion of the retention member has elastically deformed back toward the original configuration once the tab has passed beyond the opening such that the second portion directly engages the support inside the opening to prevent the rotation of the clip relative to the support;

the retention member is further defined as a plurality of retention members spaced from each other, each of the retention members including a respective first portion and a respective second portion, each of the retention members extend to a respective distal end and each of the retention members is movable between the initial and final positions;

the tab is further defined as a plurality of tabs, with each respective retention member including a respective pair of the tabs opposing each other respectively, each of the respective pair of the tabs extending from the first portion of the respective retention members;

the respective tabs each include a sloped surface increasing in thickness as the respective sloped surface extends away from the respective distal end;

the respective first portions of the retention members each deform along the sloped surface of the pair of the tabs of the respective retention members when the first portion of the retention members are in the initial position, and the respective first portions of the retention members deform back when the pair of the tabs of the respective retention members passes beyond the opening to the final position such that the second portion of the respective retention members directly engages the support inside the opening;

the retention members are further defined as a first tube and a second tube spaced from the first tube;

the first and second tubes each include the distal end, the pair of the tabs and the first and second portions;

the first and second tubes each include an outer surface and an inner surface opposing the respective outer surface, with the outer surface of the respective tubes surrounding the inner surface of the respective tubes, and with the pair of the tabs of the respective tubes extending from the outer surface of the respective tubes;

the outer surface of the first tube defines a first region, a second region, a third region and a fourth region, with the first and third regions of the first tube opposing each other, and the second and fourth regions of the first tube opposing each other;

one of the pair of the tabs of the first tube is disposed along the first region of the first tube and another one of the pair of the tabs of the first tube is disposed along the third region of the first tube;

the outer surface of the second tube defines a first region, a second region, a third region and a fourth region, with the first and third regions of the second tube opposing each other, and the second and fourth regions of the second tube opposing each other;

one of the pair of the tabs of the second tube is disposed along the first region of the second tube and another one of the pair of the tabs of the second tube is disposed along the third region of the second tube;

the opening of the support is defined by a periphery having a plurality of sides and a plurality of ends cooperating with the sides;

one of the pair of the tabs of the first tube directly engages one of the sides of the periphery and another one of the pair of the tabs of the first tube directly engages another one of the sides of the periphery when in the initial position;

one of the pair of the tabs of the second tube directly engages one of the sides of the periphery and another one of the pair of the tabs of the second tube directly engages another one of the sides of the periphery when in the initial position; and the outer surface of the first tube along the first and third regions of the first tube directly engages the sides of the periphery when the pair of the tabs of the first tube passes beyond the opening to prevent the rotation of the clip relative to the support when in the final position, and the outer surface of the second tube along the first and third regions directly engages the sides of the periphery when the pair of the tabs of the second tube passes beyond the opening to prevent the rotation of the clip relative to the support when in the final position.

17. The assembly as set forth in claim 16 wherein:

the retention members further include a third tube spaced from the first and second tubes;

the third tube includes the distal end, the pair of the tabs, the first and second portions and the outer and inner surfaces;

the outer surface of the third tube defines a first region, a second region, a third region and a fourth region, with the first and third regions of the third tube opposing each other, and the second and fourth regions of the third tube opposing each other;

one of the pair of the tabs of the third tube is disposed along the second region of the third tube and another one of the pair of the tabs of the third tube is disposed along the fourth region of the third tube; and the pair of the tabs of the first and second tubes are disposed in substantially a same orientation relative to each other, and the pair of the tabs of the third tube are disposed in a transverse orientation relative to the pair of the tabs of the first and second tubes.

18. The assembly as set forth in claim 1 wherein the support includes a base portion and a raised portion protruding outwardly from the base portion to present a depression under the raised portion, and wherein the raised portion defines the opening.

19. A vehicle comprising:

a condenser, radiator and fan apparatus including a support defining an opening;

a conduit configured to supply a fluid to the condenser, radiator and fan apparatus;

a clip attachable to the support via the opening, with the clip including a body configured to retain the conduit;

wherein the clip includes a retention member extending from the body and having a first portion inserted through the opening to attach the clip to the support and a second portion directly engaging the support inside the opening to prevent rotation of the clip relative to the support;

wherein the retention member includes a tab and the retention member is movable between an initial position from which the first portion of the retention member elastically deforms from an original configuration as the tab is inserted into the opening and a final position at which the first portion of the retention member has elastically deformed back toward the original configuration once the tab has passed beyond the opening such that the second portion directly engages the support inside the opening to prevent the rotation of the clip relative to the support; and wherein the first and second portions of the retention member cooperate to present an outer surface that is continuous and unbroken, and the tab extends outwardly directly from part of the outer surface of the first portion such that the part of the outer surface is directly behind the tab.

\* \* \* \* \*